(12) United States Patent
Luo et al.

(10) Patent No.: US 12,285,750 B2
(45) Date of Patent: Apr. 29, 2025

(54) HYDROPHILIC AND HYDROPHOBIC COMPOSITE PACKING-BASED ROTATING PACKED BED AND SYSTEM

(71) Applicant: BEIJING UNIVERSITY OF CHEMICAL TECHNOLOGY, Beijing (CN)

(72) Inventors: Yong Luo, Beijing (CN); Yanzhen Lu, Beijing (CN); Yong Cai, Beijing (CN); Guangwen Chu, Beijing (CN); Wei Liu, Beijing (CN); Haikui Zou, Beijing (CN); Baochang Sun, Beijing (CN); Jianfeng Chen, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 790 days.

(21) Appl. No.: 17/607,564

(22) PCT Filed: Apr. 24, 2020

(86) PCT No.: PCT/CN2020/086581
§ 371 (c)(1),
(2) Date: Oct. 29, 2021

(87) PCT Pub. No.: WO2020/221116
PCT Pub. Date: Nov. 5, 2020

(65) Prior Publication Data
US 2022/0219132 A1 Jul. 14, 2022

(30) Foreign Application Priority Data
Apr. 29, 2019 (CN) .......................... 201910355051.9

(51) Int. Cl.
*B01J 8/10* (2006.01)
*B01D 53/14* (2006.01)
(Continued)

(52) U.S. Cl.
CPC ............ *B01J 8/10* (2013.01); *B01D 53/1468* (2013.01); *B01D 53/1475* (2013.01);
(Continued)

(58) Field of Classification Search
CPC ....... B01J 8/00; B01J 8/08; B01J 8/085; B01J 8/087; B01J 8/10; B01J 19/00; B01J 19/18; B01J 19/32
See application file for complete search history.

(56) References Cited

U.S. PATENT DOCUMENTS 6,827,916 B2 * 12/2004 Guo .................... C01B 33/18
501/154

FOREIGN PATENT DOCUMENTS

| CN | 201260790 Y | 6/2009 |
| CN | 102220184 A | 10/2011 |
| (Continued) | | |

OTHER PUBLICATIONS

Machine translation of CN 102220184 A, which is provided in IDS filed on Jun. 22, 2022 and published Oct. 19, 2011 (Year: 2011).*
(Continued)

*Primary Examiner* — Natasha E Young
(74) *Attorney, Agent, or Firm* — CANTOR COLBURN LLP (57) ABSTRACT

The present application provides a hydrophilic and hydrophobic composite packing-based rotating packed bed and a system. A hydrophobic packing and a hydrophilic packing are formed into a composite packing. When said packing cuts liquid, the hydrophobic packing can sufficiently disperse the liquid so as to make the dispersion of the liquid in the packing zone more uniform, and the wettability of the hydrophilic packing allows the liquid to spread sufficiently so as to increase the wetting efficiency of said packing. The phenomenon of droplet aggregation caused to liquid in a (Continued)

single hydrophobic packing zone and the phenomenon of reduction of liquid turbulence caused to liquid in a single hydrophilic packing zone can be avoided. Therefore, applying a hydrophilic and hydrophobic composite packing to a rotating packed bed can further improve the mass transfer and mixing performance thereof.

9 Claims, 8 Drawing Sheets (51) Int. Cl.
*B01D 53/18* (2006.01)
*B01D 53/62* (2006.01)
*B01D 53/78* (2006.01)
*B01D 53/86* (2006.01)
*B01J 19/18* (2006.01)
*B01J 19/32* (2006.01)

(52) U.S. Cl.
CPC ......... *B01D 53/185* (2013.01); *B01D 53/62* (2013.01); *B01D 53/78* (2013.01); *B01D 53/8612* (2013.01); *B01J 19/18* (2013.01); *B01J 19/32* (2013.01); *B01D 2251/304* (2013.01); *B01D 2251/604* (2013.01); *B01D 2251/606* (2013.01); *B01D 2257/304* (2013.01); *B01D 2257/504* (2013.01)

(56) References Cited

FOREIGN PATENT DOCUMENTS

| CN | 203389355 U | 1/2014 |
| CN | 110252238 A | 9/2019 |

OTHER PUBLICATIONS

International Search Report for International Application No. PCT/CN2020/086581; Date of Mailing, Jul. 1, 2020.

* cited by examiner

FIG. 6 a
HYDROPHILIC AND HYDROPHOBIC COMPOSITE PACKING-BASED ROTATING PACKED BED AND SYSTEM

CROSS REFERENCE TO RELATED APPLICATIONS

This is the U.S. national stage of application No. PCT/CN2020/086581, now WO 2020/221116 filed on Apr. 24, 2020. Priority under 35 U.S.C. § 119 (a) and 35 U.S.C. § 365 (b) is claimed from Chinese Application No. 201910355051.9, filed on Apr. 29, 2019, the disclosure of which is also incorporated herein by reference.

TECHNICAL FIELD

The present application relates to the technical field of reactors, in particular to a hydrophilic and hydrophobic composite packing-based rotating packed bed and a system.

BACKGROUND

Packing is the core structure of a high-gravity rotating bed, and it is also one of the key factors affecting mass transfer and mixing in the rotating packed bed. The structure, material and surface properties of the packing will affect the hydrodynamic properties such as liquid dispersion in the rotating bed, size of droplet, thickness of liquid film and pressure drop, and further affect the mass transfer and mixing process of the high-gravity rotating bed. Therefore, in order to further optimize the mass transfer and mixing performance of the rotating packed bed, the research on the structure, material and surface properties of packing in the rotating packed bed is particularly important. At present, the application of hydrophilic materials or hydrophobic materials to the rotating packed bed only focuses on single hydrophobic packing or single hydrophilic packing for specific reaction, the particularity of the high-gravity environment itself is not considered, and there are many defects.

SUMMARY

In order to overcome the defects, the present application provides a hydrophilic and hydrophobic composite packing-based rotating packed bed and a system.

In a first aspect, the embodiment of the present application provides a hydrophilic and hydrophobic composite packing-based rotating packed bed, which includes:
 a rotating chamber, a packing is provided in the rotating chamber, the packing is used to cut a liquid into liquid microelements in micron-nano size, wherein the packing includes a first part and a second part provided around a center of the rotating chamber, the second part is located on an outer side of the first part, the surface of one of the first part and the second part is a hydrophilic surface, and the surface of the other is a hydrophobic surface.

In some embodiments, the packing further includes a third part, the third part is located between the first part and the second part, and a water contact angle of the surface of the third part is between the surfaces of the first part and the second part.

In some embodiments, the packing includes a plurality of cutting layers formed through rolling of shaft, and the first part and the second part each include at least one cutting layer.

In some embodiments, two side surfaces of each cutting layer are respectively fit with one side surfaces of adjacent cutting layers.

In some embodiments, in the plurality of cutting layers, at least one side surface of at least one cutting layer is fit with one side surface of the adjacent cutting layer, and a gap with a set width is formed between at least one side surface of at least one cutting layer and one side surface of the adjacent cutting layer.

In some embodiments, water contact angles of the surfaces of the plurality of cutting layers sequentially increase or decrease along a direction towards the center of the rotating chamber.

In some embodiments, the roughness of the hydrophilic surface is 412.6 nm, the water contact angle is 44±0.6°, the roughness of the hydrophobic surface is 83.7 nm, and the water contact angle is 113±0.9°.

In some embodiments, the hydrophilic surface is formed by grinding through a sand blasting process and the hydrophobic surface is formed by spraying different types of particles.

In some embodiments, the packing further includes a third part, the third part is located on an inner side of the first part or an outer side of the second part, and a water contact angle of the surface of the third part is between the surfaces of the first part and the second part.

In a second aspect, the embodiment of the present application provides a reaction system, which includes the rotating packed bed.

The Present Application has the Following Beneficial Effects:

The present application provides a hydrophilic and hydrophobic composite packing-based rotating packed bed and a system. A hydrophobic packing and a hydrophilic packing are formed into a composite packing. When the packing cuts liquid, the hydrophobic packing can sufficiently disperse the liquid so as to make the dispersion of the liquid in the packing zone more uniform, and the wettability of the hydrophilic packing allows the liquid to spread sufficiently so as to increase the wetting efficiency of the packing. Different mixing effects can be achieved by means of reasonable combination. Due to the limited number of hydrophilic packing layers and hydrophobic packing layers in the composite packing, the phenomenon of droplet aggregation caused to liquid in a single hydrophobic packing zone and the phenomenon of reduction of liquid turbulence caused to liquid in a single hydrophilic packing zone can be avoided. The negative effects of hydrophilicity can be alleviated or offset by means of hydrophobicity, and the negative effects of hydrophobicity can be alleviated or offset by means of hydrophilicity. Therefore, applying a hydrophilic and hydrophobic composite packing to a rotating packed bed can further improve the mass transfer and mixing performance thereof.

BRIEF DESCRIPTION OF THE DRAWINGS

The specific embodiments of the present application will be further described below in detail with reference to the drawings.

Illustrated in (1) of FIG. 5A is a single-modified (hydrophilic) integral packing structure in the prior art; illustrated in (2) of FIG. 5A is a hydrophilic and hydrophobic composite integral packaging structure 1 in an embodiment of the present application.

Illustrated in (1) of FIG. 5B is a single-modified (hydrophilic) integral packing structure in the prior art; illustrated in (2) of FIG. 5B is a hydrophilic and hydrophobic composite integral packing structure 2 in an embodiment of the present application.

Illustrated in (1) of FIG. 5C is a hydrophilic and hydrophobic composite pre-dispersed packing structure in an embodiment of the present application; illustrated in (2) of FIG. 5C is a single-modified (hydrophobic) pre-dispersed packing structure in the prior art.

DETAILED DESCRIPTION OF THE EMBODIMENTS

In order to more clearly describe the present application, the present application will be further described below in combination with the exemplary embodiments with reference to the drawings. Similar components in the drawings are represented by the same reference signs. Those skilled in the art should understand that the contents described below are descriptive rather than restrictive, and should not limit the scope of protection of the present application.

Various cross-sectional views according to the embodiments of the present application are illustrated in the drawings. These drawings are not drawn to scale, in which some details are enlarged for the purpose of clear expression, and some details may be omitted. The shapes of various areas and layers illustrated in the drawings and the relative size and position relationship between them are only exemplary. In practice, there may be deviations due to manufacturing tolerances or technical limitations, and those skilled in the art may additionally design zones/layers with different shapes, sizes and relative positions according to actual needs.

At present, the application of hydrophilic materials or hydrophobic materials to the rotating packed bed only focuses on a single hydrophobic packing or a single hydrophilic packing. Hydrophobic packings used in the rotating packed bed include foam nickel packings subjected to hydrophobic modification treatment, PTFE packings with hydrophobic characteristics in the material itself, etc. However, the characteristics of the high-gravity environment itself are not considered, the coupling effect of the hydrophilic and hydrophobic modification and the rotating packed bed is poor, and it does not fully match the high-gravity environment. Therefore, the modification of current packing surface can be further improved.

In one aspect, the present application provides a hydrophilic and hydrophobic composite packing-based rotating packed bed. Please refer to FIG. 1. The rotating packed bed includes a rotating chamber, a packing 10 is provided in the rotating chamber, and the packing 10 is used to cut a liquid into micron-nano liquid microelements in micron-nano size. The packing 10 includes a first part 11 and a second part 12 provided around the center of the rotating chamber, the second part 12 is located on an outer side of the first part 11, the surface of one of the first part 11 and the second part 12 is a hydrophilic surface, and the surface of the other is a hydrophobic surface.

In the rotating packed bed provided in this aspect, a hydrophobic packing and a hydrophilic packing are formed into a composite packing. When the packing cuts liquid, the hydrophobic packing can sufficiently disperse the liquid so as to make the dispersion of the liquid in the packing zone more uniform, and the wettability of the hydrophilic packing allows the liquid to spread sufficiently so as to increase the wetting efficiency fraction of the packing. Moreover, the combination of the two packings can alleviate the problems caused by single modification. At the same time, due to the limited number of hydrophilic packing layers and hydrophobic packing layers in the composite packing, the phenomenon of droplet aggregation caused to liquid in a single hydrophobic packing zone and the phenomenon of reduction of liquid turbulence caused to liquid in a single hydrophilic packing zone can be avoided. Applying a hydrophilic and hydrophobic composite packing to a rotating packed bed can further improve the mass transfer and mixing performance thereof.

Figure 1:
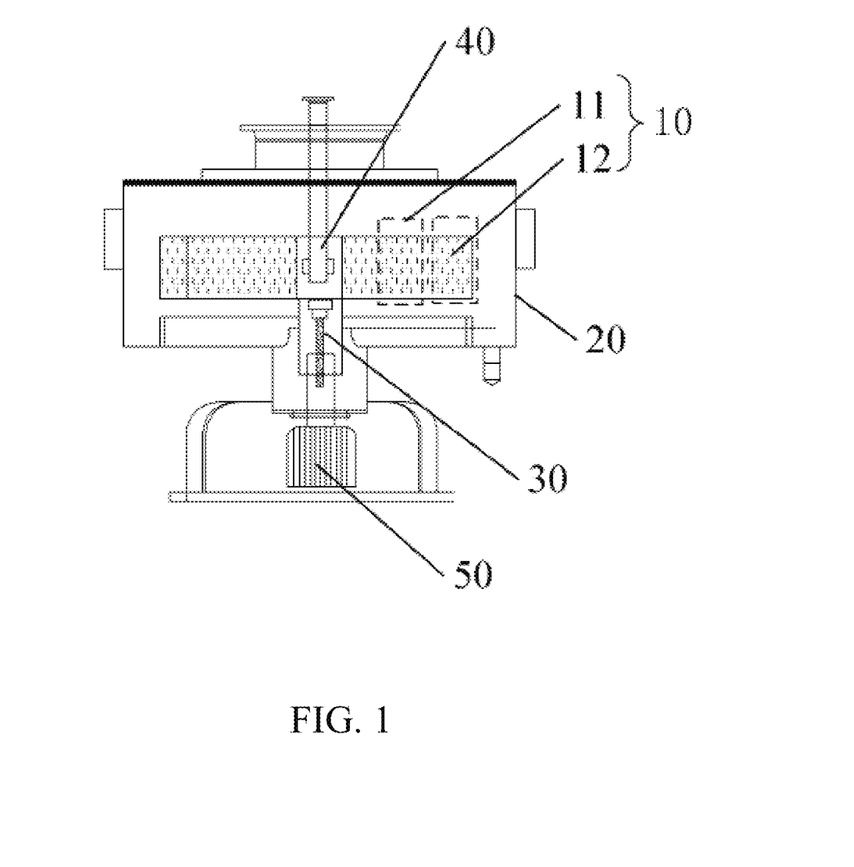
FIG. 1 illustrates a schematic diagram of a structure of a hydrophilic and hydrophobic composite packing-based rotating packed bed in an embodiment of the present application.

In some specific embodiments, continuously referring to FIG. 1, the rotating packed bed includes a housing 20 with a holding chamber, a rotor is fixed in the housing, the rotor includes a cavity forming a rotating chamber and a rotating shaft 30 fixed at the center of the rotating chamber, the packing is fixed or placed in the rotating chamber, the rotating chamber is annular, and the center includes a cavity for the insertion of a liquid distributor 40, the liquid sprayed by the liquid distributor 40 can be cut into micron and nano droplets or liquid films by the packing under the rotation of the rotating chamber.

The rotating chamber of the rotating packed bed is driven by a motor 50 connected with the rotating shaft. The model and type of the motor are not limited in the present application.

For the needs to some special reactions, the structure of the rotating packed bed could be make feasible improvement. For example, in order to cope with a high-pressure system, an oil seal structure is added on the basis of the present application; in order to cope with a heating system, an insulating ring, a microwave feeder and the like are added on the basis of the present application. The above improvements are improvements that can be inferred by those skilled in the art, which will not be exhausted in the present application.

It needs to be noted that the micron-nano scale in the embodiment of the present application should be understood as micron or nano scale, that is, the micron-nano scale ranges from 1 nm to 100 um.

In some embodiments, the material of packing is nickel, copper, stainless steel or the like. For example, the packing is a wire mesh of stainless steel, a copper mesh, foam copper or foam ceramics. The material of the packing may also be cordierite, sepiolite, foam ceramics, foam nickel or $Al_2O_3$, which is not limited in the present application.

In some embodiments, the rotating speed of the rotating packed bed is 400 rpm, 800 rpm, 1200 rpm, 1600 rpm, 2000 rpm or 2400 rpm, which is not limited in the present application.

In addition, in some embodiments, the liquid distributor is provided with four holes in a radial direction, and the diameter of the holes is 1 mm.

The spacing between the holes in the liquid distributor is 2 mm, and a disperse phase is sprayed onto a wire mesh rotor through the liquid distributor.

The packing in the embodiment of the present application will be described below in detail.

The packing may include only a first part and a second part, that is, the entire packing surface is formed by a hydrophilic surface and a hydrophobic surface.

Of course, the packing may further include a third part, the third part is a part not subjected to hydrophilic or hydrophobic treatment, the third part is located between the first part and the second part, and the hydrophilicity of the surface of the third part is between the hydrophilicity of the surfaces of the first part and the second part, thus forming a hydrophilic-unmodified-hydrophobic structure.

In an embodiment, the packing includes a plurality of cutting layers formed through rolling of shaft, and the first part and the second part each include at least one cutting layer.

The hydrophilic surface may be located on an inner side of the hydrophobic surface. Taking the packing including above cutting layers as an example, the packing includes a hydrophilic layer, an unmodified layer and a hydrophobic layer. The hydrophilic layer is located on an inner side of the hydrophobic layer, so that the liquid is first dispersed through the hydrophilic layer to form liquid film at micronnano size in the process of being cut by layers. The liquid film formed at the initial stage of cutting increases the stability of the liquid and will not aggregate and form large droplets. Moreover, due to the limited number of layers in the hydrophilic layer, the impact on the turbulence of the liquid is small, which can be ignored. In the subsequent cutting through the hydrophobic layer, when leaving the packing, it is dispersed into a large number of small droplets. Since the liquid can move in a large space after being thrown out the packing, and the droplets are thrown out in a beam-like shape, even if it is dispersed into a large number of small droplets, the probability of collision will not be significantly increased, thus obtaining the best mass transfer and mixing effects.

The hydrophilic surface may also be located on an outer side of the hydrophobic surface, that is, the hydrophilic layer is located on an outer side of the hydrophobic layer. Thus although the effect achieved when the hydrophilic layer is located on the inner side cannot be achieved, compared with the existing packing with single modified treatment (hydrophilic or hydrophobic) the number of the hydrophilic layer is less than that of the single modified hydrophilic layer, Therefore, the phenomenon of droplet aggregation caused to liquid in a single hydrophobic packing zone and the phenomenon of reduction of liquid turbulence caused to liquid in a single hydrophilic packing zone can be avoided. The negative effects of hydrophilicity can be alleviated or offset by means of hydrophobicity, and the negative effects of hydrophobicity can be alleviated or offset by means of hydrophilicity. Therefore, applying a hydrophilic and hydrophobic composite packing to a rotating packed bed can further improve the mass transfer and mixing performance thereof.

The hydrophilic surface may be prepared through a sand blasting method. Taking a stainless steel wire mesh as an example, the sand blasting method uses compressed air as power to throw out quartz sand, emery, iron sand and the like, which impact the surface of workpiece at high speed, and increase the rough structure of the surface of the stainless steel wire mesh by grinding, so as to obtain the hydrophilic surface.

The hydrophobic surface is prepared through Multi-spray drying method. Taking a stainless steel wire mesh as an example, firstly, polytetrafluoroethylene powder is adhered to the surface of the ordinary stainless steel wire mesh through electrostatic spraying, and then the ordinary stainless steel wire mesh adhered with polytetrafluoroethylene powder is placed in an oven at 300-350° C. for about 30 minutes. This process can remove adhesives, dispersants and surfactants, so as to form a coated stainless steel wire mesh with materials have low surface energy, i.e., hydrophobic stainless steel wire mesh.

It can be understood that grinding with different granular materials or spraying with different powders will form different hydrophilic surfaces. Therefore, the desired hydrophilic surface can be obtained by adjusting the type of materials. At the same time, through the adjustment of the materials, a hydrophilic and hydrophobic composite in which the hydrophobicity of the surfaces of the plurality of cutting layers sequentially increases, or sequentially decreases, or increases first and then decreases, or decreases first and then increases along a direction towards the center of the rotating chamber can be formed, which is not limited in the present application.

Figure 2A:
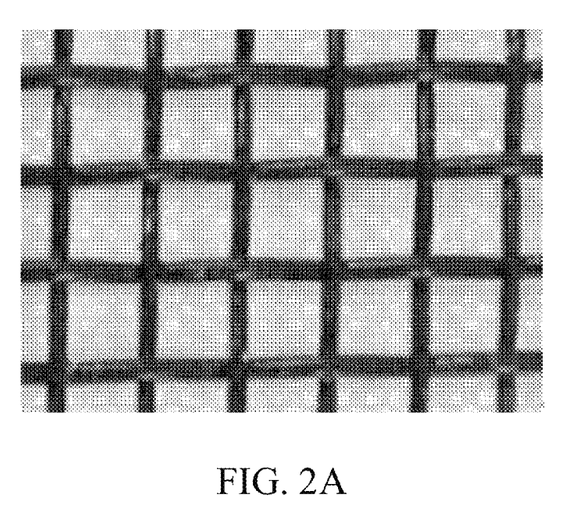
FIG. 2A illustrates a real object image of a wire packing subjected to hydrophobic treatment by one material in an embodiment of the present application.
Figure 3A:
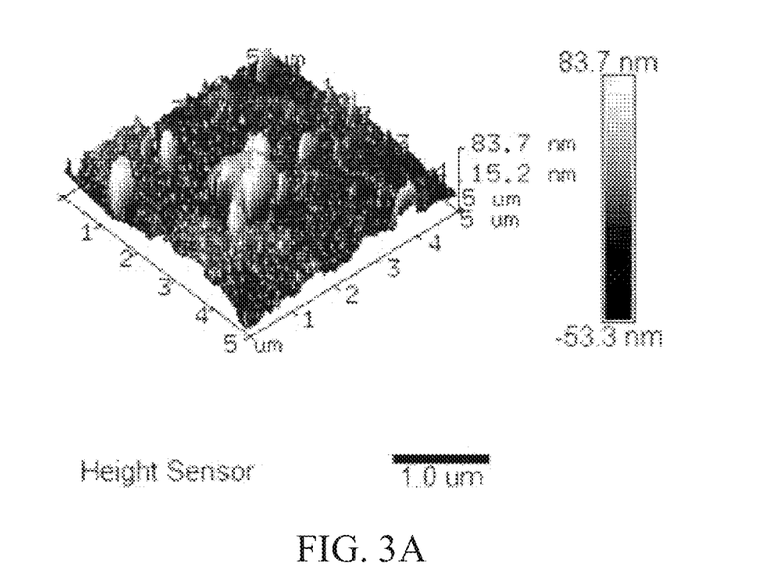
FIG. 3A illustrates an AFM 3D simulation picture of the wire packing in FIG. 2A.

FIG. 2A illustrates a schematic diagram of a microstructure of a hydrophobic wire mesh formed through treatment by adopting one material described above. FIG. 3A illustrates an AFM 3D simulation picture of FIG. 2A. The test shows that its roughness (Ra) is 83.7 nm.

Figure 4A:
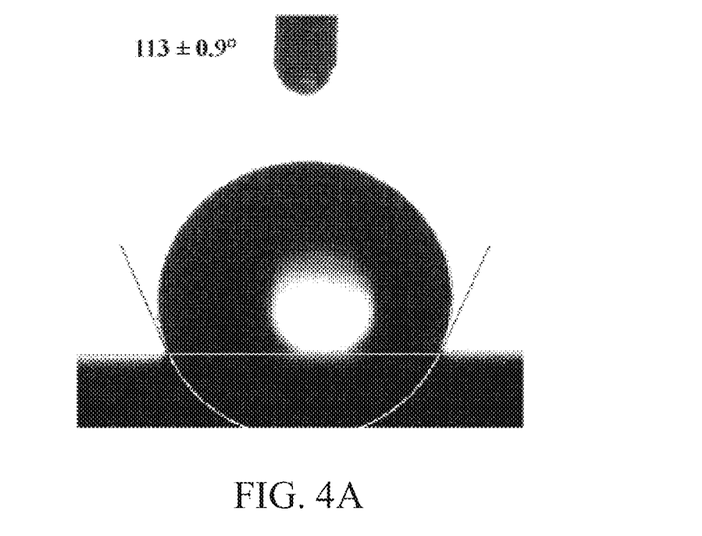
FIG. 4A illustrates a test view in a wetting test of the wire packing in FIG. 2A.
Figure 4B:
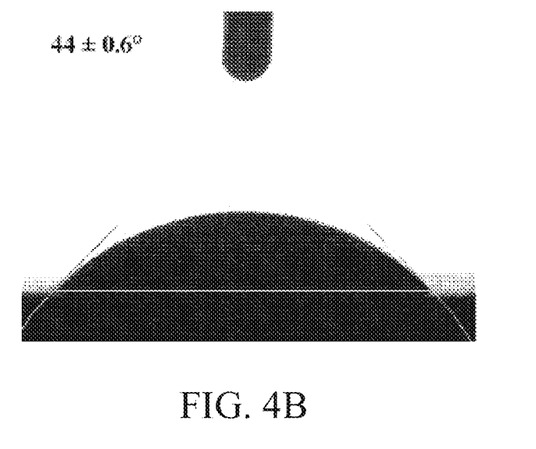
FIG. 4B illustrates a test view in a wetting test of the wire packing in FIG. 2B.

FIG. 4A illustrates a wetting image in a contact angle test of FIG. 2A, and its water contact angle is 113±0.9°.

Figure 2B:
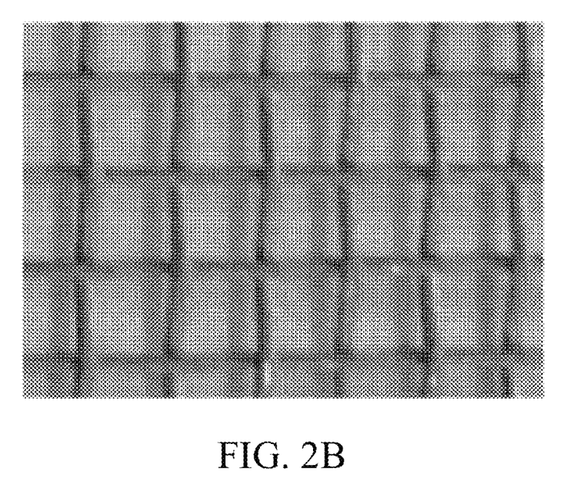
FIG. 2B illustrates a real object image of a wire packing subjected to hydrophilic treatment by the other material in an embodiment of the present application.
Figure 3B:
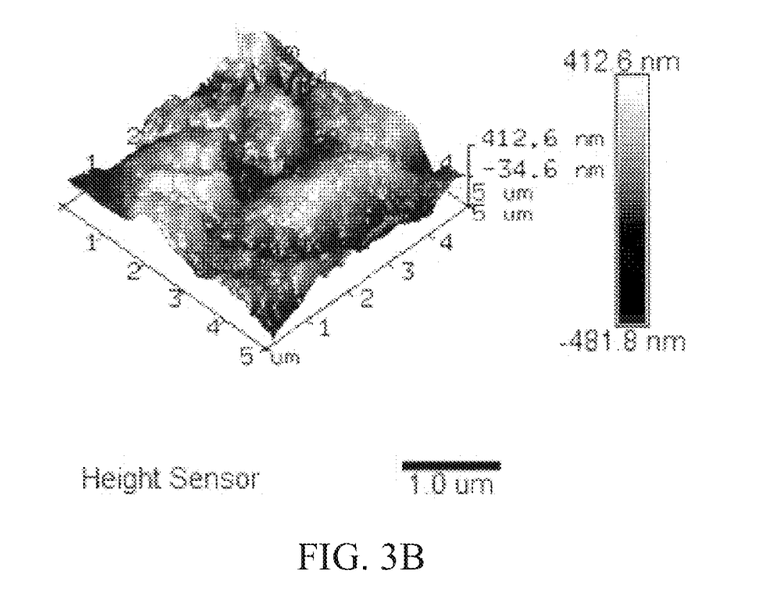
FIG. 3B illustrates an AFM 3D simulation picture of the wire packing in FIG. 2B.
Figure 4C:
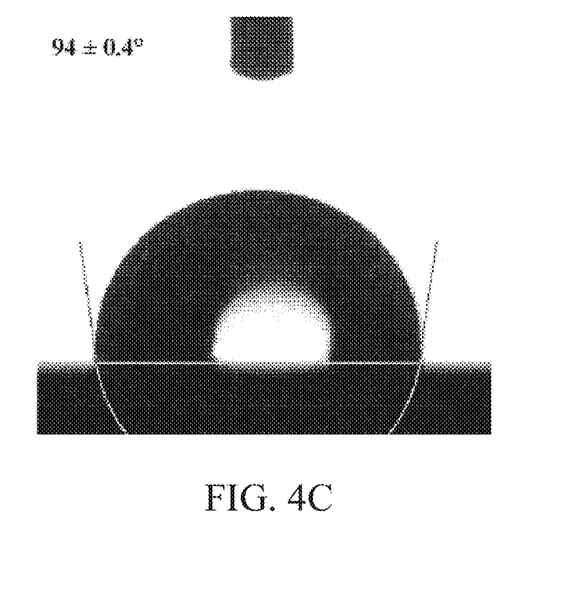
FIG. 4C illustrates a test view in a wetting test of the wire packing in FIG. 2C.

FIG. 2B illustrates a schematic diagram of a microstructure of a hydrophilic wire mesh formed through treatment by adopting another material described above. FIG. 3B illustrates an AFM 3D simulation picture of FIG. 2B. The test shows that its roughness (Ra) is 412.6 nm. FIG. 4C illustrates a wetting image in a contact angle test of FIG. 2B, and its water contact angle is 44±0.6°.

Figure 2C:
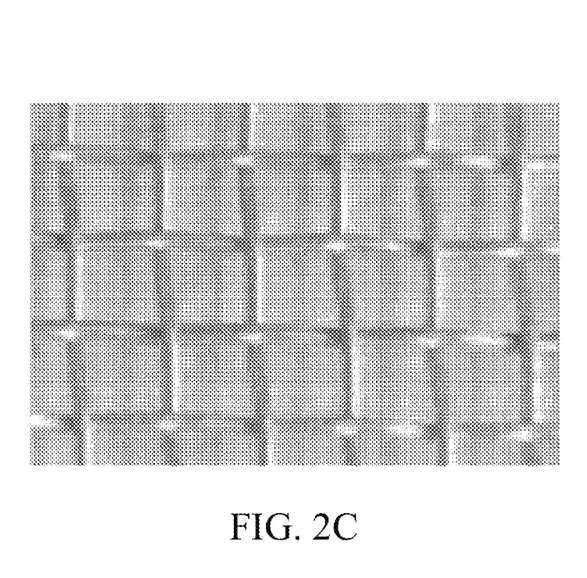
FIG. 2C illustrates a real object image of a wire packing not subjected to modification treatment in an embodiment of the present application.
Figure 3C:
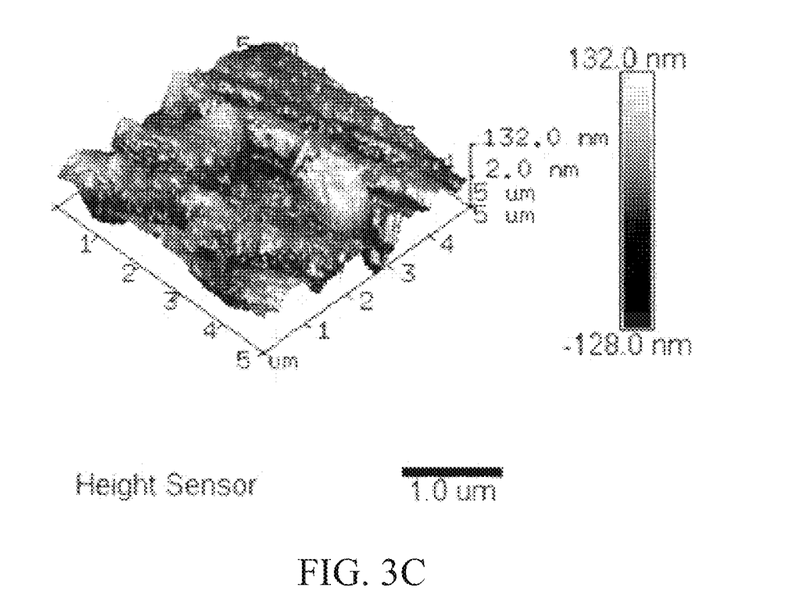
FIG. 3C illustrates an AFM 3D simulation picture of the wire packing in FIG. 2C.

FIG. 2C illustrates a schematic diagram of a microstructure of a hydrophobic wire mesh formed through treatment by adopting another material described above. FIG. 3C illustrates an AFM 3D simulation picture of FIG. 2C. The test shows that its roughness (Ra) is 132 nm. FIG. 4C illustrates a wetting image in a contact angle test of FIG. 2C, and its water contact angle is 94±0.4°.

Figure 5A:
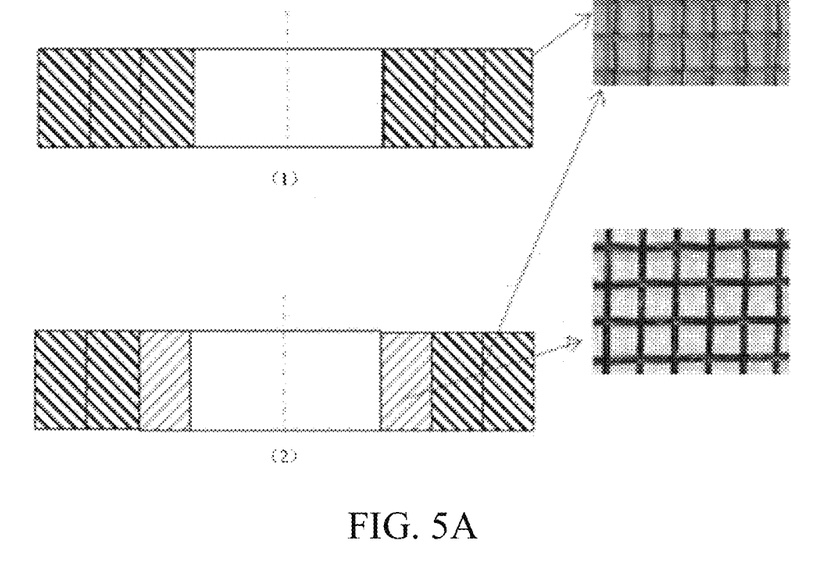
FIG. 5A illustrates a schematic diagram 1 of various different integral hydrophilic and hydrophobic composite packings in an embodiment of the present application.
Figure 5B:
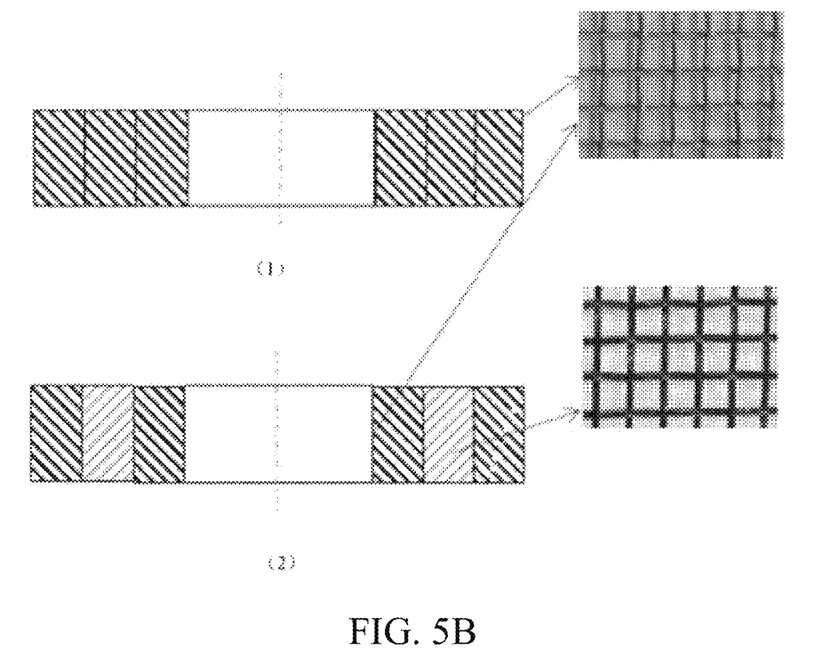
FIG. 5B illustrates a schematic diagram 2 of various different integral hydrophilic and hydrophobic composite packing in an embodiment of the present application.
Figure 5C:
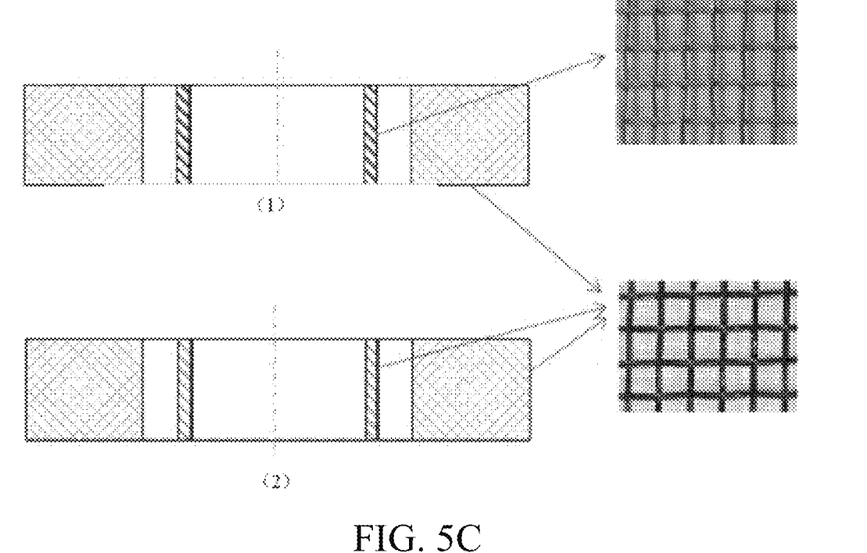
FIG. 5C illustrates a schematic diagram of various different pre-dispersed hydrophilic and hydrophobic composite packing in an embodiment of the present application.

In some embodiments, referring to FIG. 5A to FIG. 5C, the hydrophilic and hydrophobic composite packing structure has two types, one is an integral hydrophilic and hydrophobic composite packing, and the other is a pre-dispersed hydrophilic and hydrophobic composite packing.

FIG. 5A and FIG. 5B respectively illustrate two integral hydrophilic and hydrophobic composite packings. It can be seen that two side surfaces of each cutting layer are respectively fit with one side surfaces of adjacent cutting layers. Taking three cutting layers as an example, it is divided into three layers in the radial direction. The three layers are distributed with wire meshes with different wettability, and the wire meshes of each layer is in close contact without spacing.

Illustrated in (1) of FIG. 5A is one of single integral packings (prior art), and each cutting layer is a wire mesh illustrated in FIG. 2B. Illustrated in (2) of FIG. 5A is an integral packing in an embodiment of the present application, which includes three cutting layers, the cutting layer on the innermost side is a wire mesh illustrated in FIG. 2A, and the two cutting layers on the outer sides are wire meshes illustrated in FIG. 2B, thus forming a hydrophilic and hydrophobic composite integral packing.

Illustrated in (1) of FIG. 5B is one of single integral packings (prior art), and each cutting layer is a wire mesh illustrated in FIG. 2B. Illustrated in (2) of FIG. 5B is an integral packing in an embodiment of the present application, which includes three cutting layers, the cutting layer in the middle is a wire mesh illustrated in FIG. 2A, and the two cutting layers on the two sides are wire meshes illustrated in FIG. 2B, thus forming a hydrophilic and hydrophobic composite integral packing.

FIG. 5C is a pre-dispersed packing. Taking three layers in FIG. 5C as an example, the pre-dispersed hydrophilic and hydrophobic composite packing is divided into three layers in the radial direction. Only one layer of wire mesh is distributed on the inner layer, the inner layer is separated from the middle layer by a certain distance, and the middle layer is in close contact with the wire mesh on the outer side without spacing.

Illustrated in (1) of FIG. 5C is a pre-dispersed packing in an embodiment of the present application. The innermost layer separated is a wire mesh illustrated in FIG. 2B, and on the outer side and fit together is a wire mesh illustrated in FIG. 2A, thus forming a hydrophilic hydrophobic composite pre-dispersed packing. Illustrated in (2) of FIG. 5C is a single modified pre-dispersed packing in the prior art, and each cutting layer thereof consists of a wire mesh illustrated in FIG. 2A.

Of course, there may be other forms of hydrophilic and hydrophobic composites in the embodiments of the present application, and the number of the cutting layers is not limited to three, which will not be repetitively described here.

In addition, in some embodiments, the mesh number of the hydrophilic and hydrophobic modified stainless steel wire mesh is 24.

Further, in another aspect, the present application provides a gas-liquid reaction or liquid-liquid reaction system using the hydrophilic and hydrophobic composite packing-based rotating packed bed.

Figure 6:
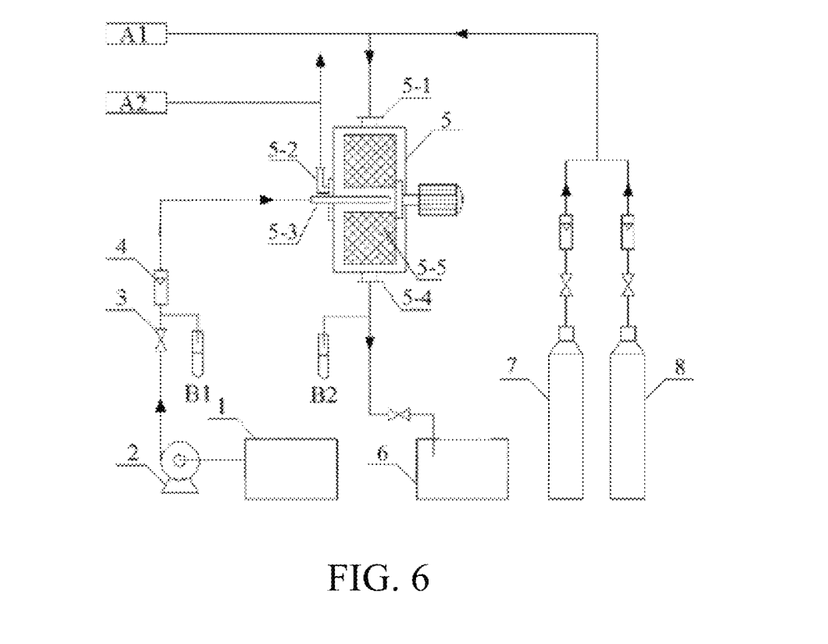
FIG. 6 illustrates a schematic diagram of a structure of a high-gravity reaction system in an embodiment of the present application.

FIG. 6 illustrates a reaction system, in which 1 is a raw material tank; 2 is a peristaltic pump; 3 is a flow control valve; 4 is a liquid flow meter; 5 is a rotating packed bed reactor; 5-1 is a gas inlet; 5-2 is a gas outlet; 5-3 is a liquid distributor; 5-4 is a liquid outlet; 5-5 is a packing; 6 is a product tank; 7 is a high-pressure gas bottle; 8 is a high-pressure gas bottle; A1 and A2 are gas inlet and outlet sampling; B1 and B2 are liquid inlet and outlet sampling.

When in use, the liquid is delivered to the liquid inlet through the peristaltic pump, and the liquid volume is adjusted by adjusting the power of the peristaltic pump. The liquid flows through the liquid distributor and is sprayed onto the rotating packing, which is cut and dispersed by the packing to form a large number of small droplets and liquid films. Gas enters the rotating packed bed through the gas inlet, and flows out from the gas outlet after fully contacting with the liquid in the packing zone, and the liquid flows out from the liquid outlet.

The hydrophilic and hydrophobic composite packing-based rotating packed bed consists of a gas inlet (5-1), a gas outlet (5-2), a liquid distributor (5-3), a liquid outlet (5-4) and a packing (5-5). The liquid flows through the liquid distributor and is sprayed onto the rotating packing, which is cut and dispersed by the packing to form a large number of small droplets and liquid films. Gas enters the rotating packed bed through the gas inlet, and flows out from the gas outlet after fully contacting with the liquid in the packing zone, and the liquid flows out from the liquid outlet. When the packing cuts the liquid, the hydrophobic wire mesh can fully disperse the liquid and make the liquid dispersed more uniformly in the packing zone. The wettability of the hydrophilic wire mesh can allow the liquid to spread sufficiently and increase the wetting efficiency of the packing.

This aspect will be described below in combination with specific application scenarios.

Scenario 1

Referring to FIG. 6, in the process of $CO_2$ absorption, the absorption solution is NaOH solution with a concentration of 1 mol/L, the feed gas is $N_2$—$CO_2$ mixed gas, and the content of $CO_2$ is 10%. The diameter of hole of the liquid distributor is 1 mm, the hole spacing is 2 mm, the mesh number of the wire mesh is 24, the rotating speed of the rotor is 1600 rpm, the feed liquid volume is 25 L/h, the feed gas volume is 1500 L/h, an integral hydrophilic and hydrophobic composite packing is used, and the reaction temperature is normal temperature.

After detection, the absorption rate of the method of the present application is about 55%.

Scenario 2

Referring to FIG. 6, in the process of $CO_2$ absorption, the absorption solution is NaOH solution with a concentration of 1 mol/L, the feed gas is $N_2$—$CO_2$ mixed gas, and the content of $CO_2$ is 10%. The hole diameter of the liquid distributor is 1 mm, the hole spacing is 2 mm, the mesh number of the wire mesh is 24, the rotating speed of the rotor is 1600 rpm, the feed liquid volume is 25 L/h, the feed gas volume is 1500 L/h, a pre-dispersed hydrophilic and hydrophobic composite packing is used, and the reaction temperature is normal temperature.

After detection, the absorption rate of the method of the present application is about 65%.

Scenario 3

Referring to FIG. 6, in the process of $H_2S$ absorption, the absorption solution is $Na_2CO_3$ solution with a concentration of 1 mol/L, the solution contains 20 mg/L commercial "888" catalyst, the feed gas is $N_2$—$H_2S$ mixed gas, and the content of $H_2S$ is 2000 ppm. The diameter of hole of the liquid distributor is 1 mm, the hole spacing is 2 mm, the mesh number of the wire mesh is 24, the rotating speed of the rotor is 1600 rpm, the feed liquid volume is 25 L/h, the feed gas volume is 400 L/h, an integral hydrophilic and hydrophobic composite packing is used, and the reaction temperature is normal temperature.

After detection, the absorption rate of the method of the present application is more than 95%.

Scenario 4

Referring to FIG. 6, in the process of $H_2S$ absorption, the absorption solution is $Na_2CO_3$ solution with a concentration of 1 mol/L, the solution contains 20 mg/L commercial "888" catalyst, the feed gas is $N_2$—$H_2S$ mixed gas, and the content of $H_2S$ is 2000 ppm. The hole diameter of the liquid distributor is 1 mm, the hole spacing is 2 mm, the mesh number of the wire mesh is 24, the rotating speed of the rotor is 1600 rpm, the feed liquid volume is 25 L/h, the feed gas volume is 400 L/h, a pre-dispersed hydrophilic and hydrophobic composite packing is used, and the reaction temperature is normal temperature.

After detection, the absorption rate of the method of the present application is more than 95%.

From the detailed description of the above embodiments and scenarios, it can be seen that different mixing effects can be achieved by means of reasonable combination. Due to the limited number of hydrophilic packing layers and hydrophobic packing layers in the composite packing, the phenomenon of droplet aggregation caused to liquid in a single hydrophobic packing zone and the phenomenon of reduction of liquid turbulence caused to liquid in a single hydrophilic packing zone can be avoided. The negative effects of hydrophilicity can be alleviated or offset by means of hydrophobicity, and the negative effects of hydrophobicity can be alleviated or offset by means of hydrophilicity. Therefore, applying a hydrophilic and hydrophobic composite packing to a rotating packed bed can further improve the mass transfer and mixing performance thereof.

Obviously, the above embodiments of the present application are only examples to clearly illustrate the present application, rather than limiting the embodiments of the present application. For those skilled in the art, other changes or modifications in different forms may be made on the basis of the above description, and all embodiments cannot be exhausted here, and all obvious changes or modifications derived from the technical solution of the present application are still within the scope of protection of the present application.

The invention claimed is:

1. A hydrophilic and hydrophobic composite packing-based rotating packed bed, wherein the rotating packed bed comprises:
   a rotating chamber, a packing is provided in the rotating chamber, the packing is used to cut a liquid into liquid microelements in micron-nano size, wherein
   the packing comprises a first part and a second part provided around a center of the rotating chamber, the second part is located on an outer side of the first part, the surface of one of the first part and the second part is a hydrophilic surface, and the surface of the other is a hydrophobic surface
   wherein the packing further comprises a third part, the third part is located between the first part and the second part, and a water contact angle of the surface of the third part is between the surfaces of the first part and the second part.

2. The rotating packed bed according to claim 1, wherein the packing comprises a plurality of cutting layers formed through rolling of shaft, and the first part and the second part each comprise at least one cutting layer.

3. The rotating packed bed according to claim 2, wherein two side surfaces of each cutting layer are respectively fit with one side surfaces of adjacent cutting layers.

4. The rotating packed bed according to claim 3, wherein in the plurality of cutting layers, at least one side surface of at least one cutting layer is fit with one side surface of the adjacent cutting layer, and a gap with a set width is formed between at least one side surface of at least one cutting layer and one side surface of the adjacent cutting layer.

5. The rotating packed bed according to claim 2, wherein water contact angles of the surfaces of the plurality of cutting layers sequentially increase or decrease along a direction towards the center of the rotating chamber.

6. The rotating packed bed according to claim 1, wherein the roughness of the hydrophilic surface is 412.6 nm, the water contact angle is 44±0.6°, the roughness of the hydrophobic surface is 83.7 nm, and the water contact angle is 113±0.9°.

7. The rotating packed bed according to claim 1, wherein the hydrophilic surface is formed by grinding through a sand blasting process and the hydrophobic surface is formed by spraying different types of particles.

8. The rotating packed bed according to claim 1, wherein the packing further comprises a third part, the third part is located on an inner side of the first part or an outer side of the second part, and a water contact angle of the surface of the third part is between the surfaces of the first part and the second part.

9. A reaction system, wherein the reaction system comprises the rotating packed bed according to claim 1.

* * * * *